(12) United States Patent
Weatherill et al.

(10) Patent No.: US 12,390,864 B2
(45) Date of Patent: Aug. 19, 2025

(54) RAILROAD TRACK RAIL DRILL

(71) Applicant: Epiroc Industrial Tools and Attachment LLC, Delhi, IA (US)

(72) Inventors: Jeffery Weatherill, Portland, OR (US); Gabe West, Portland, OR (US)

(73) Assignee: Epiroc Industrial Tools and Attachment LLC, Delhi, IA (US)

( * ) Notice: Subject to any disclaimer, the term of this patent is extended or adjusted under 35 U.S.C. 154(b) by 275 days.

(21) Appl. No.: 18/175,776

(22) Filed: Feb. 28, 2023

(65) Prior Publication Data

US 2023/0211423 A1     Jul. 6, 2023

Related U.S. Application Data

(63) Continuation of application No. 16/737,660, filed on Jan. 8, 2020, now Pat. No. 11,602,795.

(51) Int. Cl.
    *B23B 45/00*        (2006.01)
    *B23B 41/00*        (2006.01)
                 (Continued)

(52) U.S. Cl.
    CPC .......... *B23B 45/008* (2013.01); *B23B 41/006* (2013.01); *B23Q 5/326* (2013.01);
                  (Continued)

(58) Field of Classification Search
    CPC ............ B23B 45/008; B23B 2260/128; B23B 2270/32; E01B 31/06
See application file for complete search history.

(56) References Cited

U.S. PATENT DOCUMENTS

| | | | |
|---|---|---|---|
| 1,178,567 | A | 4/1916 | Wuerpel |
| 2,323,488 | A | 7/1943 | Schauer |
| (Continued) | | | |

FOREIGN PATENT DOCUMENTS

| | | |
|---|---|---|
| CN | 205519798 U | 8/2016 |
| CN | 109137646 A | 1/2019 |
| (Continued) | | |

OTHER PUBLICATIONS

International Search Report and Written Opinion in corresponding International Patent Application No. PCT/EP2021/050005 dated Apr. 19, 2021.

*Primary Examiner* — Alan Snyder
(74) *Attorney, Agent, or Firm* — Harness, Dickey & Pierce, P.L.C.

(57) ABSTRACT

A rail drill drive train can include a common drive end between a single drive motor and a common gear. A speed train end can extend from the common gear to rotate the drill spindle. A feed train end can independently extend from the common gear to advance and retract the drill spindle. The speed train end can include a sprag gear so that, without unmeshing any gears, the drill spindle is not unnecessarily rotated in the reverse direction when the drive motor is reversed to retract the drill spindle. A rail drill control circuit and related sensors can enable automatic operation throughout the complete drilling cycle without any manual input from the user other than starting the cycle. Such a fully automatic drilling cycle can minimize overall cycle time to preserve battery life and can free the user to perform other tasks between drill moving and clamping operations.

23 Claims, 10 Drawing Sheets

(51) Int. Cl.
  *B23Q 5/32*    (2006.01)
  *E01B 31/06*   (2006.01)
  *B23B 45/02*   (2006.01)

(52) U.S. Cl.
  CPC .............. *E01B 31/06* (2013.01); *B23B 45/02* (2013.01); *B23B 2215/32* (2013.01); *B23B 2260/03* (2013.01)

(56) References Cited

U.S. PATENT DOCUMENTS

| | | |
|---|---|---|
| 3,091,137 A | 5/1963 | Aronson |
| 3,640,632 A | 2/1972 | Schuman |
| 4,688,970 A | 8/1987 | Eckman |
| 5,282,704 A | 2/1994 | Screen |
| 7,001,117 B2 | 2/2006 | Mikiya et al. |
| 7,121,773 B2 | 10/2006 | Mikiya et al. |
| 7,713,004 B2 | 5/2010 | Lehto et al. |
| 8,469,640 B2 | 6/2013 | Maillard et al. |
| 9,233,423 B2 | 1/2016 | Johnson et al. |
| 9,776,252 B2 | 10/2017 | Matlik |
| 2004/0223820 A1 | 11/2004 | Shieh |
| 2010/0074701 A1 | 3/2010 | Kempen et al. |

FOREIGN PATENT DOCUMENTS

| | | |
|---|---|---|
| EP | 1410879 A1 | 4/2004 |
| EP | 2105249 B1 | 4/2011 |
| EP | 2886228 A1 | 6/2015 |
| WO | WO-2016170476 A1 | 10/2016 |

EXAMPLE RAIL DRILL STATES

| State | Main operation | Further breakdown of state's operation |
|---|---|---|
| 1 | Manual button press detected | Button state change detected (pressed) |
| 2 | Infer spindle position from limit switch states | If not in home position, go to state 3. Else go to state 4 |
| 3 | Retract to "home" position if necessary | Set direction reverse<br>Set motor full speed<br>Continue until limit switch or position sensor readings change to home (open, open) or (closed, closed) dependent upon switch type used in this drill. Go to state 11. For this case, the motor fully retracts and the user needs to press the cycle initiation button again to start a full drilling cycle. |
| 4 | Polarity switch set to forward | Set motor controller Direction signal to forward |
| 5 | Motor speed set to forward speed | Clear cycle duration counter<br>Set motor controller Speed signal to 100% |
| 6 | Detect drilling complete or broken drill bit | • Detect that power source current/voltage values change from loaded to no-load<br>• Max drill cycle duration timer expired<br>  ○ Increment cycle duration counter. Is it greater than max drill cycle duration?<br>• Fully advanced spindle position detected (by detection of limit switch or position sensor states)<br>• Excessive current represents broken drill bit (motor stops but does not retract). Go to state 11. |
| 7 | Motor speed set to off | Set motor controller Speed signal to 0%<br>Wait for short duration to ensure motor has stopped before changing direction (example, 1 second) |
| 8 | Polarity switch set to reverse | Set motor controller Direction signal to reverse |
| 9 | Motor speed set to reverse speed | Set duration timer to<br>Set motor controller Speed signal to 100% |
| 10 | Detect spindle reached retracted "home" position | • Detect power source current/voltage values change from no-load to loaded (retracted too far)<br>• Decrement cycle duration counter (Note that this may not be implemented. It is here as a possible mechanism (to prevent retracting too far).<br>  ○ If counter decrements to zero, then stop.<br>• Fully retracted spindle position reached (by detection of limit switch or positon sensor states) |
| 11 | Motor speed set to off (Cycle has completed) | Set motor controller Speed signal to 0% |

FIG. 10

RAILROAD TRACK RAIL DRILL

CROSS-REFERENCE TO RELATED APPLICATIONS

This application is a continuation of U.S. patent application Ser. No. 16/737,660 filed on Jan. 8, 2020. The entire disclosure of the above application is incorporated herein by reference.

FIELD

The present disclosure relates to a railroad track rail drill, which are drills that are specifically designed to drill holes in railroad track rails for joining lengths of railroad track rails together end-to-end.

BACKGROUND

This section provides background information related to the present disclosure which is not necessarily prior art.

Typically, railroad track rail drills are operated in the field away from easy access to electrical power where railroad track is being laid or repaired. As such, rail drills are typically driven by hydraulic power or directly by a combustion engine due to the power requirements to drill through railroad track rails.

Typically, railroad track rail drills only include a motor to drive a gear train that only rotates the drill spindle. A user must advance the drill by manually applying a forward drilling force to a feed lever throughout the drilling portion of the drilling cycle while the rail drill is clamped to the rail. When the user determines the drilling portion of the drilling cycle has completed, the user must manually applying a reverse or removal force to the feed lever to retract the drill spindle back out of the newly-drilled hole and turn off the drill, prior to unclamping the rail drill from the rail.

SUMMARY

This section provides a general summary of the disclosure and is not a comprehensive disclosure of its full scope or all of its features.

In accordance with an aspect of the present disclosure, a railroad track rail drill can include a railroad track rail drill housing supporting a railroad track rail clamp designed to selectively clamp the railroad track rail drill to a railroad track rail. A single drive motor can be coupled to the railroad track rail drill housing and can have an output shaft. A power source can be operably coupled to the single drive motor to cause the single drive motor to selectively rotate an output shaft of the single drive motor in a forward rotary direction and in a reverse rotary direction opposite the forward rotary direction. A drive train can include a common train end having a common gear operably coupled to the output shaft of the single drive motor to rotate the common gear in corresponding common gear forward and reverse rotary directions in response to rotation of the output shaft in the forward and reverse rotary directions, respectively. A feed train end of the drive train can have a spindle feed carrier operably coupled to the common gear at a first common gear connection to carry the drill spindle axially toward a spindle advanced position in response to the single drive motor selectively rotating in the forward rotary direction, and to carry a drill spindle axially toward a spindle retracted position opposite the spindle advanced position in response to the single drive motor selectively rotating in the reverse rotary direction. A speed train end of the drive train can have a speed gear operably coupled to the common gear at a second common gear connection and to the drill spindle to rotate the drill spindle in a drilling rotary direction in response to the single drive motor selectively rotating in the forward rotary direction. The second common gear connection can be separate from the first common gear connection.

In accordance with another aspect of the present disclosure, a railroad track rail drill can include a railroad track rail drill housing supporting a railroad track rail clamp designed to selectively clamp the railroad track rail drill to a railroad track rail. A drive motor can be coupled to the railroad track rail drill housing and can have an output shaft. An electrical power source can be operably coupled to the drive motor to cause the drive motor to selectively rotate an output shaft of the drive motor in a forward rotary direction and in a reverse rotary direction opposite the forward rotary direction. A drive train can include a feed train end including a spindle feed carrier operably coupled to the output shaft of the drive motor to carry a drill spindle axially toward a spindle advanced position in response to the drive motor selectively rotating in the forward rotary direction, and to carry the drill spindle axially toward a spindle retracted position opposite the spindle advanced position in response to the drive motor selectively rotating in the reverse rotary direction. The drive train can include a speed train end operably coupled to the output shaft of the drive motor and to the drill spindle to rotate the drill spindle in a drilling rotary direction in response to the drive motor selectively rotating in the forward rotary direction. A rail drill control circuit can be coupled to the electrical power source and to the drive motor. The rail drill control circuit can include a cycle initiation switch and a motor direction selector, and the rail drill control circuit can be configured, in response to a manual activation of the cycle initiation switch, to place the motor direction selector into (1) a forward direction configuration in which the power source is operably coupled to the drive motor to rotate the output shaft in the forward rotary direction, and to thereafter make a drilling completion determination without further manual input from a user, and in response to the drilling completion determination, to place the motor direction selector into (2) a reverse direction configuration in which the power source is operably coupled to the drive motor to rotate the output shaft in the reverse rotary direction, without further manual input from a user.

In accordance with additional aspects of the present disclosure, the rail drill control circuit can be further configured to selectively (3) operably disengage the power source from the drive motor in an off configuration. The rail drill control circuit can also be configured to make a cycle completion determination after making the drilling completion determination without further manual input from a user, and in response to the cycle completion determination, to operably disengage the power source from the drive motor in the off configuration.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10 is a chart of example states of a control circuit for the example railroad track rail drill of FIG. 1.

Corresponding reference numerals indicate corresponding parts throughout the several views of the drawings.

DETAILED DESCRIPTION

Figure 1:
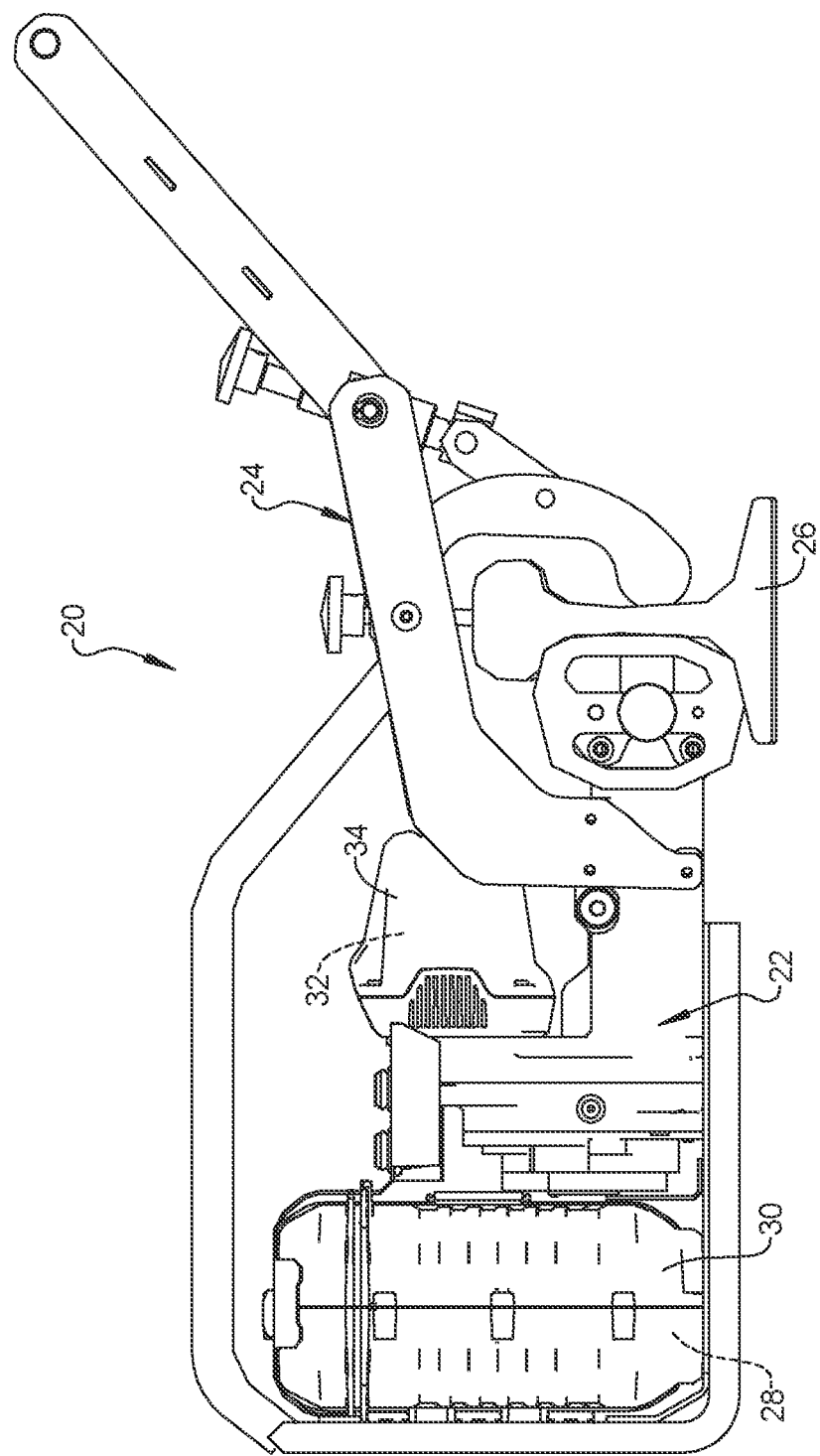
FIG. 1 is a side elevation view of one example railroad track rail drill in accordance with the present disclosure.
Figure 2:
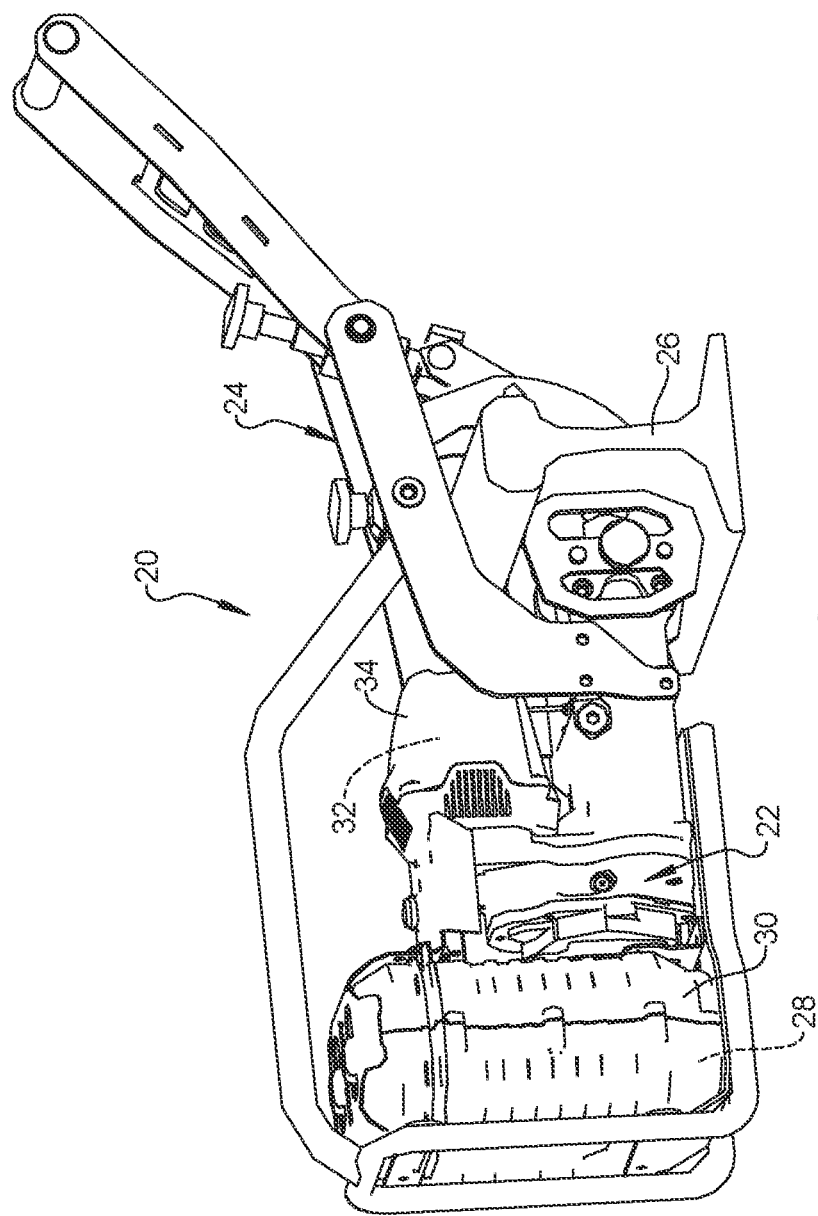
FIG. 2 is a perspective view of the example railroad track rail drill of FIG. 1.
Figure 3:
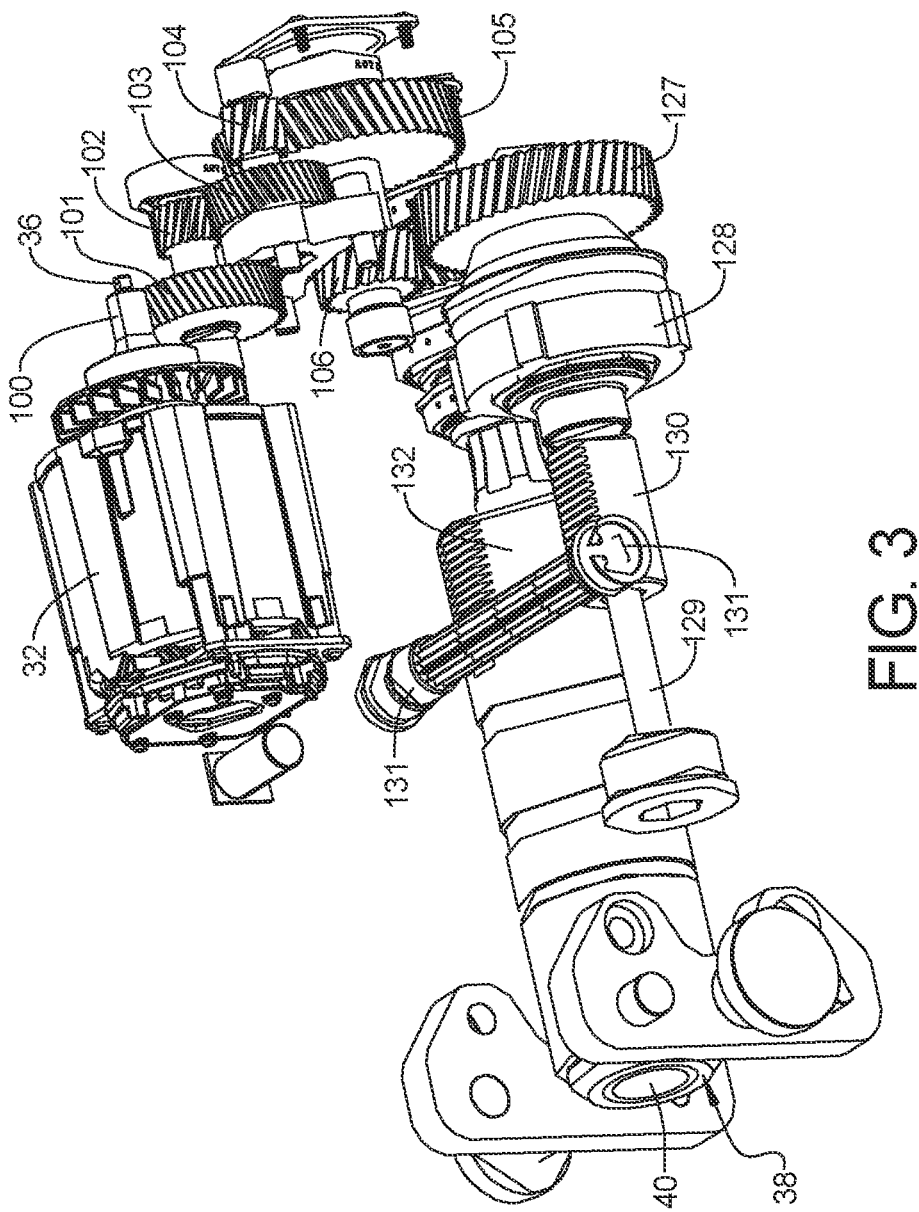
FIG. 3 is a perspective view including the drive train of the example railroad track rail drill of FIG. 1.
Figure 4:
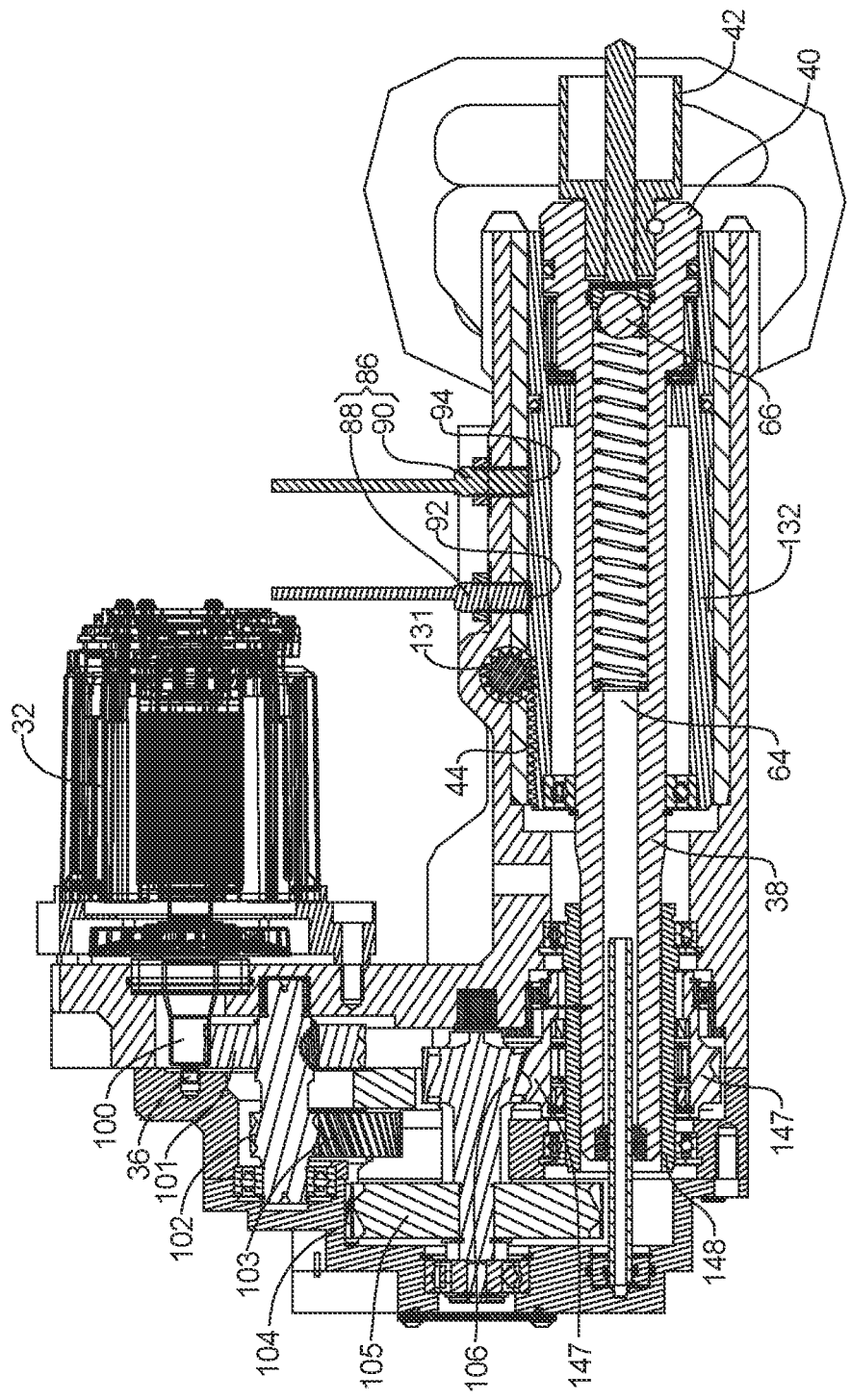
FIG. 4 is a cross-section view through the central rotary axis of the drill spindle of the example railroad track rail drill of FIG. 1, with the spindle feed carrier and spindle in the retracted position.
Figure 5:
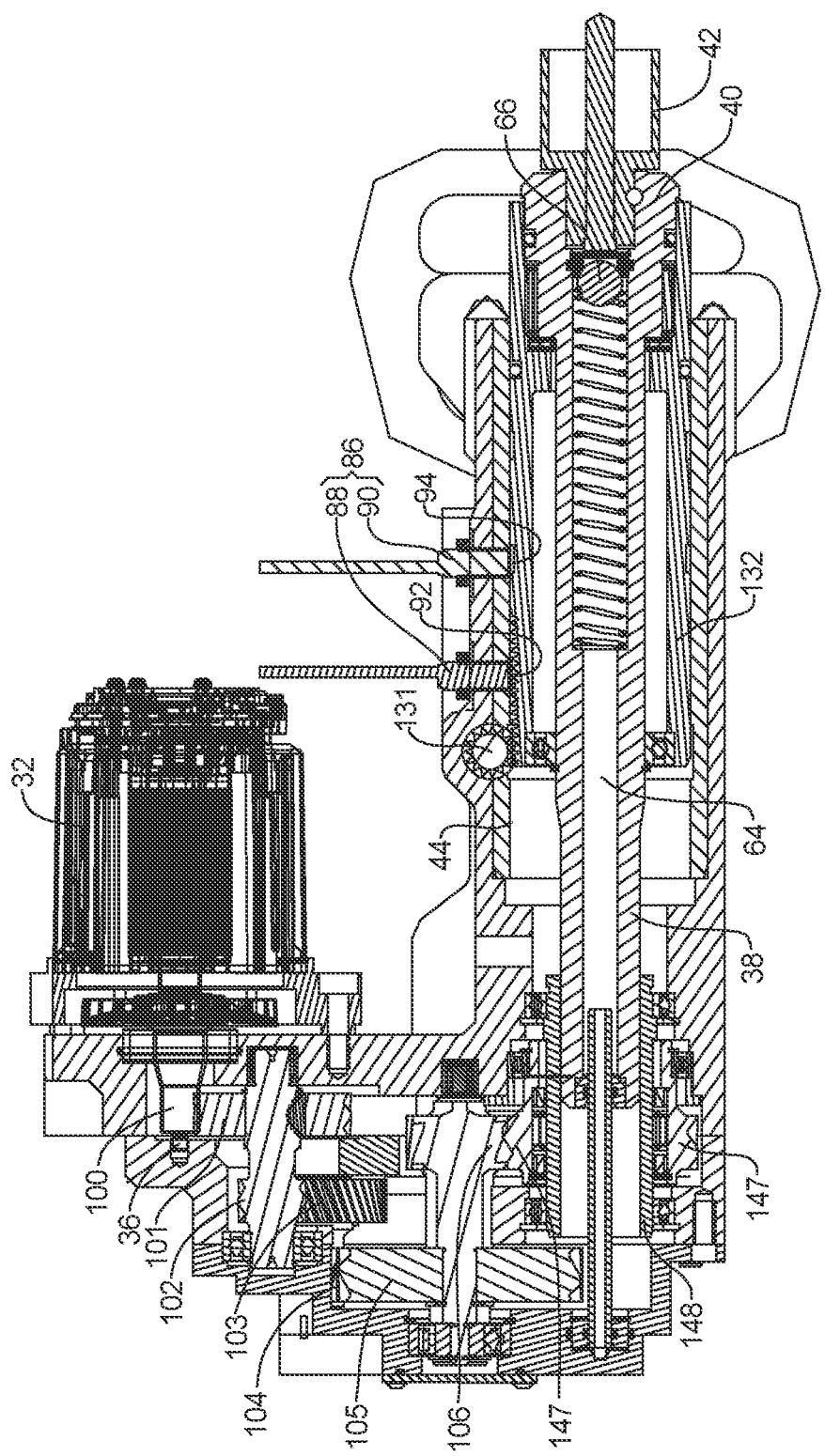
FIG. 5 is a cross-section view similar to FIG. 4, with the spindle feed carrier and spindle in the advanced position.
Figure 6:
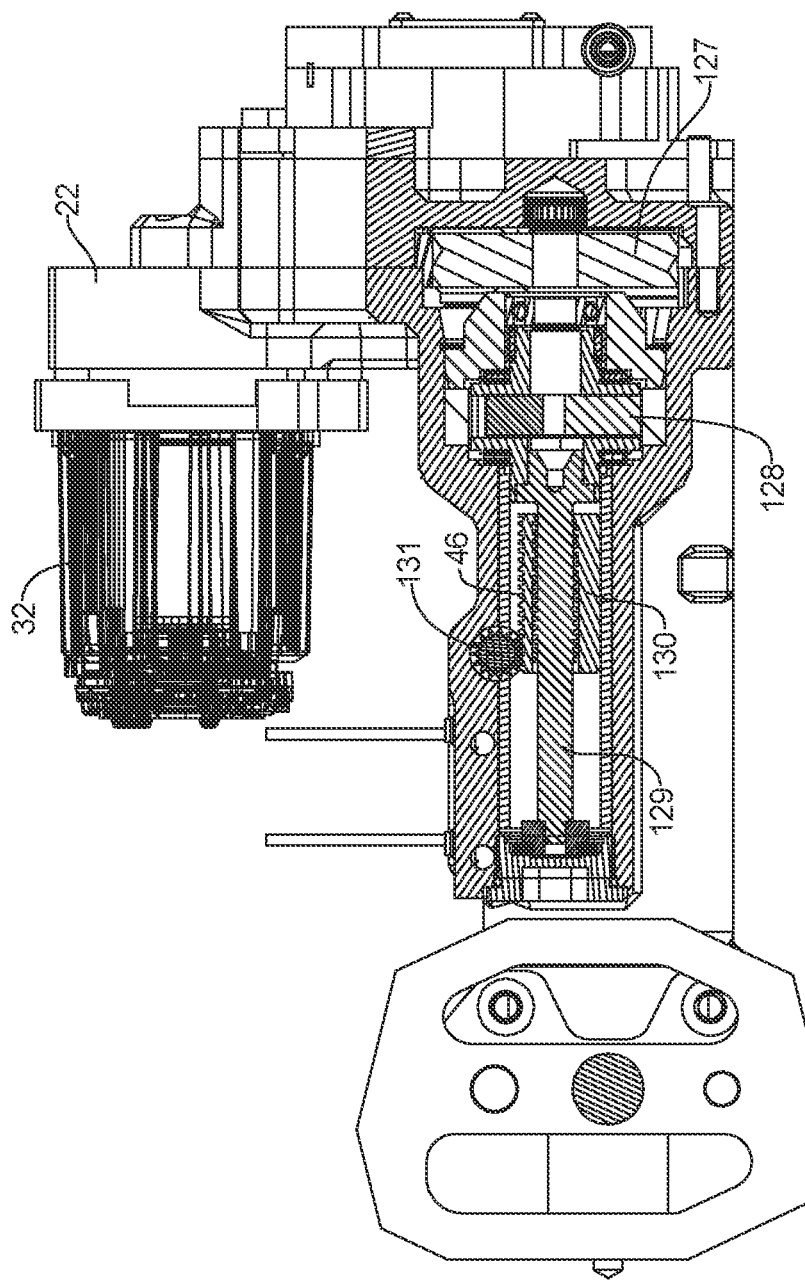
FIG. 6 is a cross-section view through the central rotary axis of the feed screw of the example railroad track rail drill of FIG. 1, with the feed drive carrier correspondingly positioned to drill spindle being in the retracted position.
Figure 7:
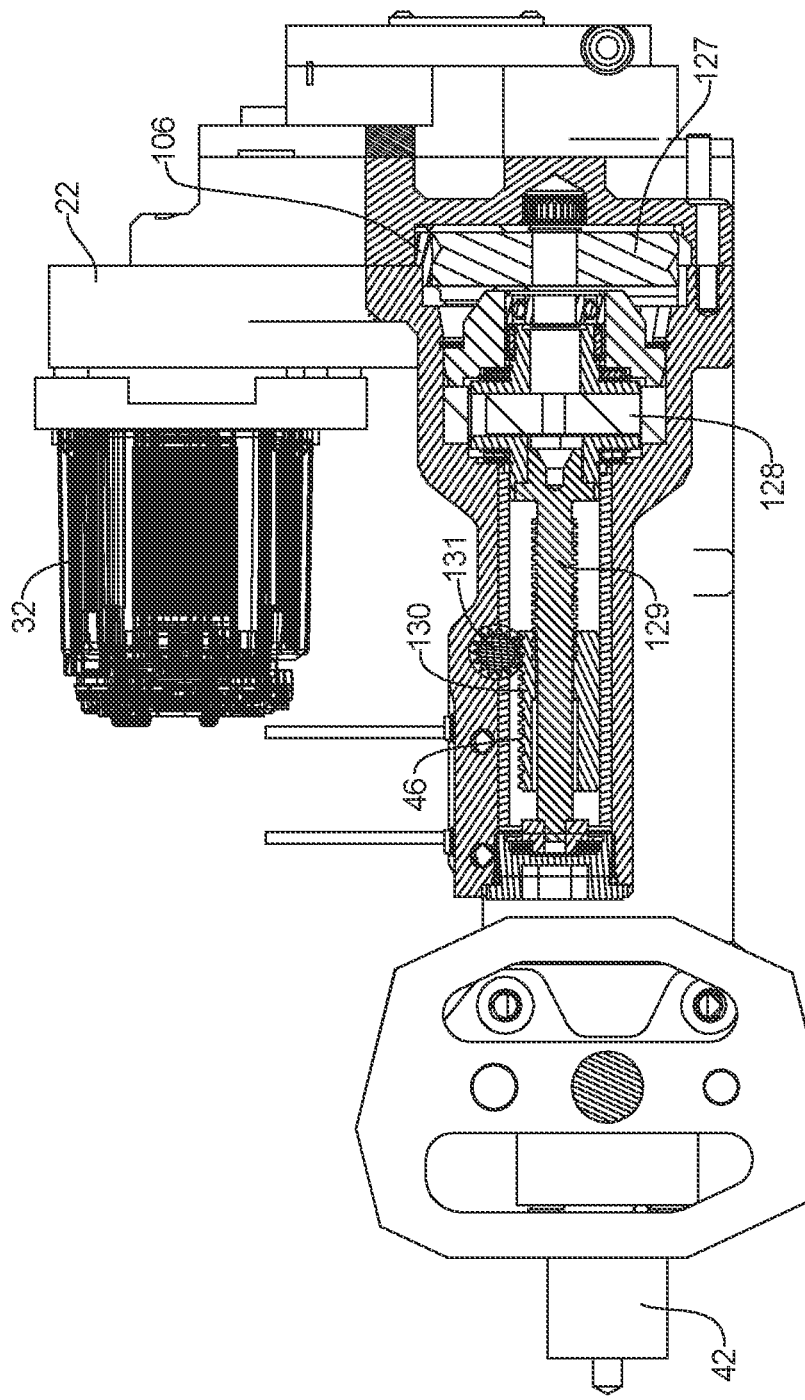
FIG. 7 is a cross-section view similar to FIG. 4, with the feed drive carrier correspondingly positioned to the drill spindle being in the advanced position.
Figure 8:
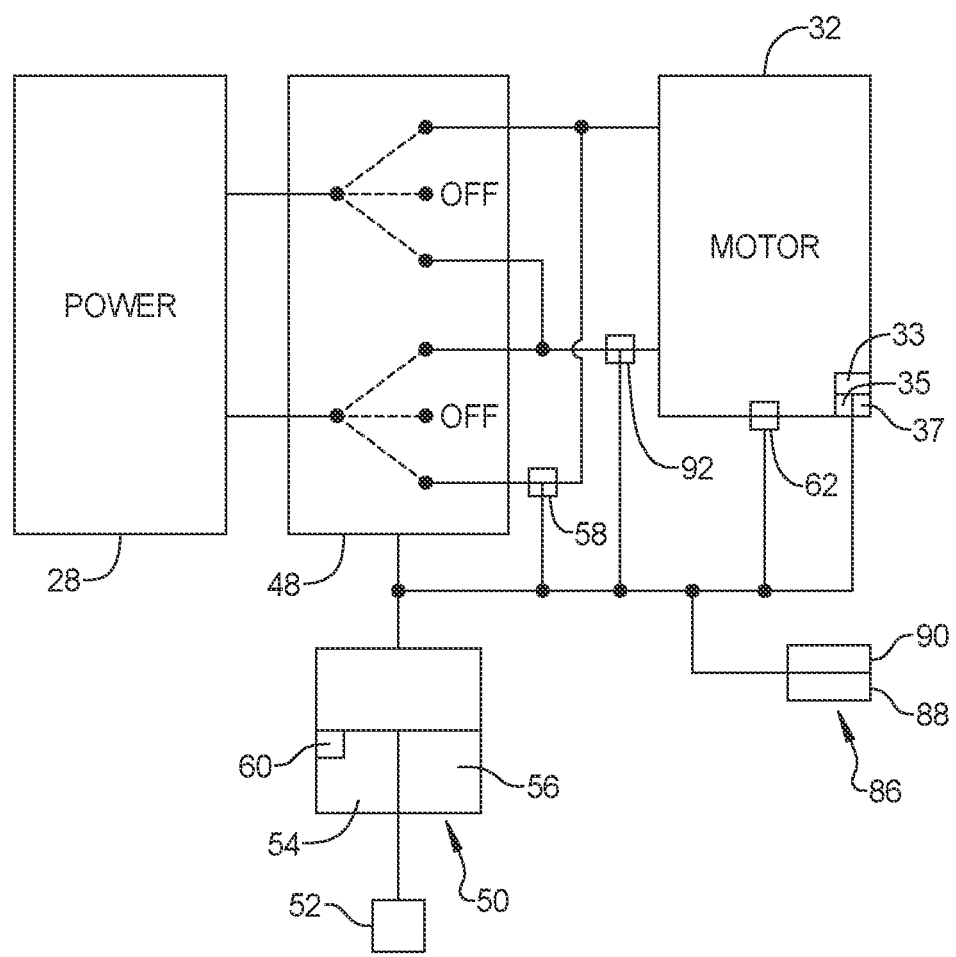
FIG. 8 is a circuit diagram including the rail drill control circuit and sensors and related components for the example railroad track rail drill of FIG. 1.

Example embodiments will now be described more fully with reference to the accompanying drawings.

FIGS. 1-9 illustrate one example of a railroad track rail drill 20 in accordance with the present disclosure. Such railroad track rail drills 20 are specifically designed to drill holes in railroad track rails for joining lengths of railroad track rails together end-to-end.

The rail drill 20 can include a rail drill housing 22 supporting a railroad track rail clamp 24, which is designed to selectively couple the rail drill 20 to a railroad track rail 26 during a drilling operation. A power source, such as a pair of rechargeable batteries 28, can be housed within a battery compartment or portion 30 of the housing 22. A power source 28 can be housed within a motor compartment or portion 34 of the housing 22. The power source 28 can be coupled to a single drive motor 32 to cause the motor 32 to selectively rotate an output shaft 36 of the single drive motor 32 in a forward rotary direction during an advancing or drilling portion of the drilling cycle of the rail drill 20 and in a reverse rotary direction opposite the forward rotary direction during a retracting portion of the drilling cycle of the rail drill 20.

A gear train or drive train can include a common train end, with each of a feed train end and a speed train end branching off of the common train end. In the illustrated example, the common train end can include gears 100-106, the feed train end can include gears 127-132, and speed train can include gears 147-148. Thus, the drive train can have three different branches or ends that are all joined together at, or each extend from, a common gear 106.

The common train end 100-106 of the drive train can include the common gear 106 operably coupled to the output shaft 36 of the single drive motor 32, via gears 100-105, to rotate the common gear in corresponding common gear forward and reverse rotary directions in response to rotation of the output shaft 36 in the forward and reverse rotary directions, respectively. Thus, the common train end can include a plurality of gears 100-105, in addition to the common gear 106. In an alternative example, the common gear 106 can be mounted directly on the output shaft 36 of the single drive motor 32 so that the common gear 106 is the only gear of the common train end.

The speed train end 147-148 of the drive train can include a one-way or sprag gear 147 operably coupled to the common gear 106 at a second common gear connection, which is separate from the first common gear connection. In addition, the sprag gear 147 is operably coupled to the drill spindle 38 to rotate the drill spindle 38 in a drilling rotary direction in response to the single drive motor 32 selectively rotating in the forward rotary direction. In other words, the sprag gear 147 transfers torque to the drill spindle 38, via the speed sleeve 148, as the single drive motor 32 selectively rotates in the forward rotary direction to cause the drill spindle 38 to rotate in the drilling rotary direction.

In contrast, the sprag gear 147 decouples the spindle 38 from rotation of the intermediate common drive gear 106 in response to the single drive motor 32 selectively rotating in the reverse direction. This is because, instead of transferring torque when rotating in this direction, the sprag gear 147 simply freewheels. As noted above, the sprag gear 147 is a one-way gear, meaning it transfers torque in only one of the two opposite rotary directions.

The drill spindle 38 can include a twist lock bit coupling 40. Such twist lock bit couplings 40 operate to hold a twist lock bit 42 by simply inserting and twisting the bit 42 in the coupling 40 in a rotary direction opposite the drilling rotary direction. There is no bit tightening mechanism, such as a set screw or clamping jaws, which must be separately manually tightened in order to retain a bit 42 in the twist lock bit coupling 40 during drilling. Rotating the twist lock bit 42 within the twist lock bit coupling 40 in the drilling rotary direction, however, operates to release the bit 42 and allow it to come out of the bit coupling 40. The drill spindle 38 can include a fluid passage 64 including a valve 66 to provide lubricating fluid to the bit 42 while drilling through the railroad track rail 26.

The feed train end 127-132 of the drive train can include a spindle feed carrier 132 operably coupled to the common gear 106 at a first common gear connection, via gears 127-131, to carry the drill spindle 38 axially toward a spindle advanced position (e.g., FIG. 5) in response to the single drive motor 32 selectively rotating in the forward rotary direction. Similarly, the spindle feed carrier 132 can be operable to carry the drill spindle 38 axially toward a spindle retracted position (e.g., FIG. 4) that is opposite the spindle advanced position in response to the single drive motor 32 selectively rotating in the reverse rotary direction.

The spindle feed carrier 132 of the feed train end of the drive train can include a driven feed rack 44. As in the illustrated example, the spindle feed carrier 132 can include an axially movable, non-rotating feed sleeve surrounding a feed portion of the drill spindle 38 with the driven feed rack 44 on an exterior of the an axially movable, non-rotating feed sleeve. The feed train end can include a feed pinion 131 that is operably coupled the common gear 106 and to the driven feed rack 44 of the spindle feed carrier 132 to drive the drill spindle 38 axially toward the spindle advanced position in response to the output shaft 36 of the single drive motor 32 selectively rotating in the forward rotary direction.

In addition, the feed pinion 131 is operably coupled to the common gear 106 and to the driven feed rack 44 to drive the spindle feed carrier 132 and the drill spindle 38 axially toward the spindle retracted position in response to the output shaft 36 of the single drive motor 32 selectively rotating in the reverse direction. Thus, the spindle feed carrier 132 can be referred to herein as a gear, because it includes driven feed rack 44 teeth enmeshed with feed pinion 131 teeth.

The feed train end of the drive train can include a feed screw 129 extending parallel to the drill spindle 38. The feed screw 129 can be operably coupled to the common gear 106 and to the feed pinion 131 to drivingly rotate the feed pinion 131. For example, the feed screw 129 can be operably coupled to the common gear 106 via gear 127 and planetary gear set 128. The feed screw 129 can be threadably engaged with cooperating threads of a feed drive carrier 130. The feed drive carrier 130 can include a feed drive rack 46 that is operably coupled to the feed pinion 131 to drivingly rotate the feed pinion 131.

The feed drive carrier 130 can be an axially movable, non-rotating feed drive sleeve surrounding, and internally threadably coupled to, the feed screw 129, and the non-rotating drive sleeve can have the feed drive rack 46 on an exterior thereof. Thus, rotation of the common gear 106 by the drive motor 32 in either direction causes rotation of the feed screw 129. The threaded engagement between the feed screw 12 and the feed drive carrier 130 means rotation of the feed screw 129 causes axial movement of the feed drive carrier 130 along the feed screw 129. This axial movement of the feed drive carrier 130 causes the feed drive rack 46 to rotate the feed pinion 131, which in turn causes axial movement of the spindle feed carrier 132 along the central rotary axis of the drill spindle 38 due to the engagement of the feed pinion 131 to the driven feed rack 44 of the spindle feed carrier 132.

As noted above, the feed train can include a spindle feed carrier 132 that can comprise an axially movable, non-rotating feed sleeve 132 surrounding a feed portion of the drill spindle 38 with the driven feed rack 44 on an exterior of the an axially movable, non-rotating feed sleeve and coupled to the feed pinion 131. The speed train can comprise a rotating, non-axially movable speed sleeve 148 surrounding a speed portion of the drill spindle 38 with the speed sleeve 148 operably coupling the sprag gear 147 to the drill spindle 38, via splines for example, to rotate the drill spindle 38 in the drilling rotary direction as the drill spindle 38 is axially advanced relative to the speed sleeve 148 by the feed train.

As in the illustrated example, the rail drill 20 can have a single drive motor 32, as opposed to multiple drive motors, that can drive both a spindle feed mechanism in the advance and retract directions, and a spindle speed in a drilling rotary direction, but not in an opposite rotary direction, while still maintaining all of the cooperating teeth pairs of the drive train in constant mesh with each other throughout operation of the rail drill 20.

A motor direction selector 48 can be coupled between an electrical power source, such as the rechargeable batteries 28, and the single drive motor 32. The motor direction selector 48 can be operable to selectively (1) couple the electrical power source 28 to the single drive motor 32 in a forward direction configuration at box 74 in which the output shaft 36 of the single drive motor 32 rotates in the forward rotary direction, and (2) couple the electrical power source 28 to the single drive motor 32 in a reverse direction configuration at box 78 in which the output shaft 36 of the single drive motor 32 rotates in the reverse rotary direction opposite the forward rotary direction, and (3) operably disengage the power source from the single drive motor in an "off" configuration at box 70.

And the rail drill control circuit 50 can be configured to make a cycle completion determination at box 80 after making the drilling completion determination at box 76 without further manual input from a user, and in response to the cycle completion determination at box 80, to place the motor direction selector 48 into the "off" configuration at box 70. In other words, the entire drilling cycle with the drill spindle 38 from the retracted position, to and through the railroad track rail 26 to the advanced position, and back away from the railroad track rail 26 to the retracted position can be automatic conducted without any other interaction from the user except pressing the cycle initiation switch 52.

A rail drill control circuit 50 can be operably coupled to the electrical power source 28, to the motor direction selector 48, and to the cycle initiation switch 52. For example, the motor direction selector can be a mechanical switch 48, a motor controller 33, including a microprocessor 35 and memory 37, or both. As an example, the rail drill control circuit 50 can include a microprocessor 54 and memory 56. In some cases, the rail drill control circuit 50 can include two microprocessors 35, 54, and in some cases, the functions of both these microprocessors 35, 54 can be performed by a single microprocessor.

Figure 9:
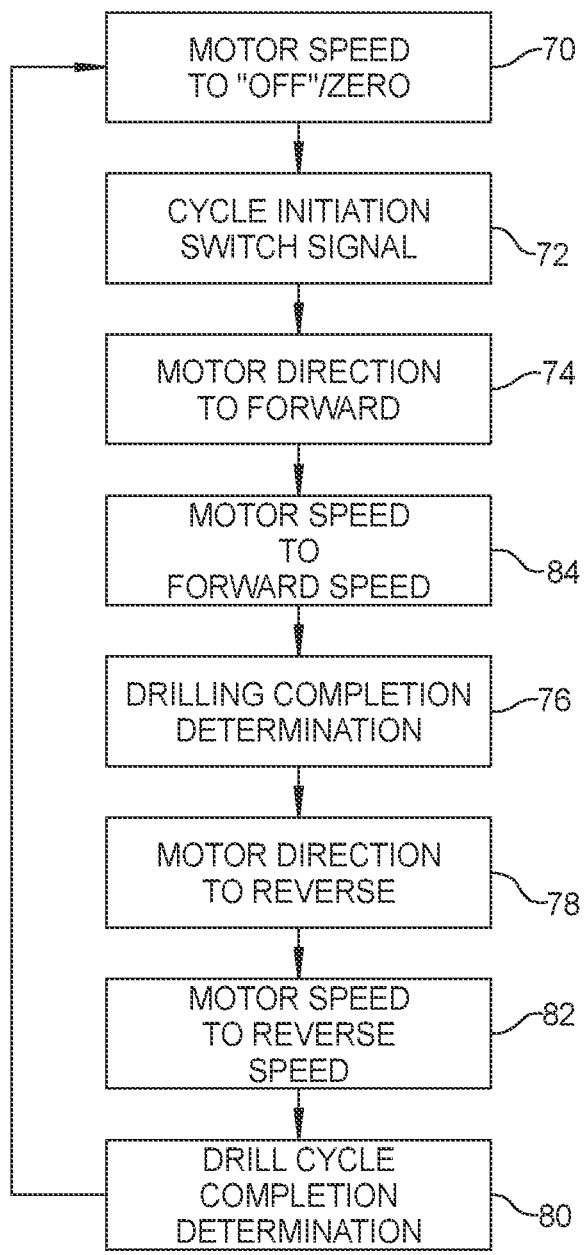
FIG. 9 is a flow chart of one exemplary overall drilling cycle of the example railroad track rail drill of FIG. 1.

With particular reference to FIGS. 9 and 10, the rail drill control circuit 50 can be configured, in response to receipt of a cycle initiation signal at box 72 from a manual activation of the cycle initiation switch 52 by a user (State 1), to place or move the motor direction selector 48 into the forward direction configuration at box 74 from an "off" configuration at box 70. For example, the microprocessor 54 can change a direction control signal connected to the motor controller 33 to the forward state (State 4). In one example, the forward and reverse direction signals can involve setting a signal to "open" (e.g., a reference voltage) for one of the two directions and to "closed" (e.g., zero volts) for the other of the two directions. The microprocessor 54 can also set a motor speed signal connected to the motor controller 33 (Box 84, State 5). In one example, the motor speed signal can involve adjusting a signal voltage from zero percent to 100 percent of a reference voltage, with zero volts corresponding to a motor "off" state.

The rail drill control circuit 50 can be configured to insure the rail drill 20 starts the drilling cycle from the home position. For example, a signal from the spindle feed position sensor or limit switch 86 can be used to infer whether the drill spindle 38 is in the home position, and if not, to move the drill spindle 38 toward the home position until the spindle feed position sensor or limit switch 86 provides the confirmatory signal (State 3).

The rail drill control circuit 50 can be configured to thereafter make a drilling completion determination at box 76 (State 6) without further manual input from a user, and in response to the drilling completion determination at box 76, to place the motor direction selector 48 into the reverse direction configuration at box 78 (State 8) without further manual input from a user. The motor direction selector can be a physical switch or can be implemented via the motor controller 33. For example, the microprocessor 54 can change a direction control signal connected to the motor controller 33 to the reverse state (State 8). The microprocessor 54 can also temporarily set the motor speed to 0 percent or "off" (State 7), and to thereafter, set a motor speed signal of the motor controller 33 (Box 82, State 9).

As an example, the control circuit 50 can include a timer or clock circuit 60 and memory 56, and the control circuit 50 can be configured to make the drilling completion determination at box 76 upon the lapse of a predetermined period of time, which is stored in the memory 56, after the manual activation of the cycle initiation switch 52 or after initiation of forward motor rotation from home (State 5 and 6). A maximum expected time to drill through the rail drill and reach the fully advanced spindle position can be determined by laboratory experimentation. Such a maximum expected drilling time should consider the maximum spindle travel available, and can be chosen to expire after a reasonable drilling time but before the spindle reaches its fully advanced position. When the timer expires, microprocessor 54 can turn off the motor by setting a speed signal that connects to the motor controller 33 to 0 percent speed or "off" (State 7).

As an example, the control circuit 50 can be coupled to a motor current sensor 58. The control circuit 50 can be configured to make the drilling completion determination at box 76 upon receiving a signal from the motor current sensor 58 indicating that the current consumption of the drive motor 32 has moved from a load current consumption indicative of active drilling, to a no-load current consumption indicative of not actively drilling; e.g. drilling completion or a broken drill bit (State 6).

For example, the control circuit 50 can be configured to make the drilling completion determination at box 76 when the current consumption of the drive motor 32 detected by the motor current sensor 58 decreases by a predetermined amount. For example, drill cycle currents for no-load, drilling, and drill bit breakage can be determined by laboratory experimentation. The microprocessor 54 can monitor the signal from current sensor 58 (State 6). If current decreases by a predetermined amount, microprocessor 54 can turn off the motor by setting a speed control signal that connects to the motor controller 33 to 0 percent speed (State 7).

Alternatively, the control circuit 50 can be configured to make the drilling completion determination at box 76 when the current consumption of the drive motor 32 detected by the motor current sensor 58 moves from a load current consumption range to a no-load current consumption range. The use of a current sensor 58 and related configuration of the control circuit 50 can help reduce the overall rail drilling cycle time. For example, motor current presets can be stored in memory 56 for no-load, load (drilling), and bit breakage. The microprocessor 54 can detect the drilling state if current sensor 58 reading is greater than the drilling current preset. If current decreases below the motor current no-load preset, microprocessor 54 can turn off the motor by setting a speed control signal that connects to the motor controller 33 to 0 percent speed or "off."

As an example, the control circuit 50 can be coupled to a motor speed sensor 62. The control circuit 50 can be configured to make the drilling completion determination at box 76 upon receiving a signal from the motor speed sensor 62 indicating that the speed of the drive motor 32 has moved from a load motor speed indicative of active drilling, to a no-load motor speed indicative of not actively drilling, e.g., drilling completion.

For example, the control circuit 50 can be configured to make the drilling completion determination at box 76 when the speed of the drive motor 32 detected by the motor speed sensor 62 increases by a predetermined amount, e.g., after initially decreasing by a predetermined amount, or after the lapse of a predetermined period of time from the initiation of the drilling cycle, or after the drill spindle 38 has been in a position between the retracted and advanced position.

Alternatively, the control circuit 50 can be configured to make the drilling completion determination at box 76 when the speed of the drive motor 32 detected by the motor speed sensor 62 moves from a load motor speed range to a no-load motor speed range. The use of a motor speed sensor 62 and related configuration of the control circuit 50 can help reduce the overall rail drilling cycle time.

As an example, the control circuit 50 can be coupled to a spindle feed position sensor 86 and the control circuit 50 can be configured to make the drilling completion determination at box 76 upon the spindle feed position sensor 86 providing a signal to the rail drill control circuit 50 indicating the drill spindle 38 is in the spindle advanced position. As in the illustrated embodiment, the position sensor 86 can comprise two proximity sensors 88, 90 that can operate to respond when they are in alignment with two grooves or recesses 92, 94 on the spindle feed carrier 132.

Turning to examples of control circuit configurations for making the cycle completion determination at box 80, the control circuit 50 can be configured to make the cycle completion determination at box 80 upon the spindle feed position sensor 86 providing a signal to the rail drill control circuit 50 indicating the spindle 38 is in, or has returned to, the spindle retracted position, e.g., at some point after the lapse of a predetermined period of time from the initiation of the drilling cycle, or after the drill spindle 38 has been in a position between the retracted and advanced position.

Multiple position sensors 86 can be used to infer or determine the position of the drill spindle 38. During the normal drill cycle there can be three spindle position regions of concern; fully retracted (home position), fully advanced, and an intermediate region between full retraction and advance. The combination of position sensor signals or readings would be unique for each of the three spindle position regions. For example, microprocessor 54 can read all position sensors 88, 90 as "closed" when the drill spindle 38 is in the fully retracted position. The microprocessor 54 can read all position sensors 88, 90 as "open" when the drill spindle 38 is in an intermediate position. The microprocessor 54 can read one position sensor 88 "open" and another position sensor 90 "closed" when the drill spindle 38 is in the fully retracted position. The microprocessor 54 can determine these three drill spindle position regions or positions as digital or analog signal inputs that can be monitored. The microprocessor 54 can modify the direction and speed of the motor 32 in response to the position sensors readings and cycle state as discussed above.

Of course, the various examples above are not mutually exclusive. For example, both a motor current sensor 58 and a spindle position sensor 86 can be provided, and the rail drill control circuit 50 can be configured to make the drilling completion determination at box 76 based upon a signal from either the current sensor 58 or from the position sensor 86 as detailed above. Thus, the rail drill control circuit 50 can be configured to make the drilling completion determination at box 76 in two different ways, which could provide a back-up in case one of the sensors fails. This can be beneficial to help insure the feed mechanism does not move past the advanced or retracted position, which could damage the components, particularly in view of the significant gear reduction ratio (e.g., 1100:1). Other combinations of the examples herein are possible.

The drive motor 32 operates in the forward rotary direction to move the drill spindle 38 from the retracted position to the advanced position during the drilling operation portion of the drilling cycle. This includes a no-load period in which the drive motor 32 operates at a no-load forward speed during the drilling or advancing portion of the drilling cycle, e.g., from initiation of the drilling cycle until the drill bit 42 initially comes into contact with the railroad track rail

26 and begins actively drilling through the railroad track rail 26. The single drive motor 32 also operates in the reverse rotary direction to move the drill spindle 38 from the advanced position to the retracted position during the retracting portion of the drilling cycle. Most, if not all, of this reverse motor operation is a no-load period in which the drive motor 32 operates at a no-load reverse speed.

As indicated on FIG. 10, the motor controller speed signal is set to the same 100 percent in both the forward and reverse directions (States 5 and 9). Alternatively, the reverse motor speed can be set to be higher (e.g., 100 percent) than the forward motor speed (e.g., 85 percent). Adjusting the motor drilling speed can be desirable, e.g., based upon what cutting bit material is installed on the drill, without changing gearing. Using a higher or full return speed can help reduce the overall drill cycle time. As another example, the rail drill 20 can include a physical motor speed regulator 92 and the rail drill control circuit 50 can be configured to adjust the motor speed regulator 92 at box 82 to operate the single drive motor 32 at a reverse speed in the reverse rotary direction that is higher than the a forward speed in the forward rotary direction at which the motor speed regulator 92 is set at box 84 to operate drive motor 32.

As described above, the rail drill control circuit 50 can send commands, such as motor speed signals, to the motor controller 33 as analog voltage levels. The rail drill control circuit 50, however, is not limited to analog motor control. The rail drill control circuit 50 can provided digital, time-varying motor control, such as pulse width modulation, or an intelligent communications control to manage the motor subsystem.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A railroad track rail drill comprising:
   a railroad track rail drill housing supporting a railroad track rail clamp designed to selectively couple the railroad track rail drill to a railroad track rail;
   a single drive motor coupled to the railroad track rail drill housing and having an output shaft;
   a power source operably coupled to the single drive motor to cause the single drive motor to selectively rotate the output shaft of the single drive motor in a forward rotary direction and in a reverse rotary direction opposite the forward rotary direction; and
   a drive train including:
   a common train end having a common gear operably coupled to the output shaft of the single drive motor to rotate the common gear in corresponding common gear forward and reverse rotary directions in response to rotation of the output shaft in the forward and reverse rotary directions, respectively;
   a feed train end having a spindle feed carrier operably coupled to the common gear at a first common gear connection to carry a drill spindle axially toward a spindle advanced position in response to the single drive motor selectively rotating in the forward rotary direction, and to carry the drill spindle axially toward a spindle retracted position opposite the spindle advanced position in response to the single drive motor selectively rotating in the reverse rotary direction; and
   a speed train end having a speed gear operably coupled to the common gear at a second common gear connection and operatively coupled to the drill spindle to rotate the drill spindle in a drilling rotary direction in response to the single drive motor selectively rotating in the forward rotary direction, wherein the second common gear connection is separate from the first common gear connection.

2. The railroad track rail drill of claim 1, wherein the speed gear is a sprag gear and is operatively coupled to the drill spindle to decouple the drill spindle from rotation of the common gear in response to the single drive motor selectively rotating in the reverse rotary direction.

3. The railroad track rail drill of claim 1, wherein the drill spindle includes a twist lock bit coupling designed to retain a twist lock drill bit during rotation of the drill spindle in the drilling rotary direction upon simply twisting the twist lock bit in the twist lock bit coupling, and without the need to separately tighten a bit tightening mechanism.

4. The railroad track rail drill of claim 1, wherein the common train end includes a plurality of gears, including the common gear.

5. The railroad track rail drill of claim 1, wherein the spindle feed carrier includes a driven feed rack, and the feed train end includes a feed pinion operably coupled the common gear and to the driven feed rack of the spindle feed carrier to drive the drill spindle axially toward the spindle advanced position in response to the output shaft of the single drive motor selectively rotating in the forward rotary direction, and to drive the spindle feed carrier and the drill spindle axially toward the spindle retracted position in response to the output shaft of the single drive motor selectively rotating in the reverse rotary direction.

6. The railroad track rail drill of claim 5, wherein the spindle feed carrier comprises an axially movable, non-rotating feed sleeve surrounding a feed portion of the drill spindle with the driven feed rack on an exterior of the axially movable, non-rotating feed sleeve.

7. The railroad track rail drill of claim 5, wherein the feed train end includes a feed screw extending parallel to the drill spindle and operably coupled to the common gear and the feed pinion to drivingly rotate the feed pinion.

8. The railroad track rail drill of claim 7, wherein the feed screw is threadably engaged with a feed drive carrier including a feed drive rack operably coupled to the feed pinion to drivingly rotate the feed pinion.

9. The railroad track rail drill of claim 8, wherein the feed drive carrier comprises an axially movable, non-rotating feed drive sleeve surrounding, and internally threadably coupled to, the feed screw, and the non-rotating feed drive sleeve having the feed drive rack on an exterior thereof.

10. The railroad track rail drill of claim 1, wherein the speed train end further includes a rotating, non-axially movable speed sleeve surrounding a speed portion of the drill spindle and operably coupling the speed gear to the drill spindle to rotate the drill spindle in the drilling rotary direction as the drill spindle is advanced relative to the speed sleeve by the feed train end.

11. A railroad track rail drill comprising:
   a railroad track rail drill housing supporting a railroad track rail clamp designed to selectively couple the railroad track rail drill to a railroad track rail;

a drive motor coupled to the railroad track rail drill housing and having an output shaft;

an electrical power source operably coupled to the drive motor to cause the drive motor to selectively rotate the output shaft of the drive motor in a forward rotary direction and in a reverse rotary direction opposite the forward rotary direction; and a drive train including:

a feed train end having a spindle feed carrier operably coupled to the output shaft of the drive motor to carry a drill spindle axially toward a spindle advanced position in response to the drive motor selectively rotating in the forward rotary direction, and to carry the drill spindle axially toward a spindle retracted position opposite the spindle advanced position in response to the drive motor selectively rotating in the reverse rotary direction; and a speed train end operably coupled to the output shaft of the drive motor and to the drill spindle to rotate the drill spindle in a drilling rotary direction in response to the drive motor selectively rotating in the forward rotary direction; and a rail drill control circuit coupled to the electrical power source and to the drive motor, the rail drill control circuit including a cycle initiation switch and a motor direction selector, and the rail drill control circuit being configured, in response to a manual activation of the cycle initiation switch, to place the motor direction selector into (1) a forward direction configuration in which the power source is operably coupled to the drive motor to rotate the output shaft in the forward rotary direction, and to thereafter make a drilling completion determination without further manual input from a user, and in response to the drilling completion determination, to place the motor direction selector into (2) a reverse direction configuration in which the power source is operably coupled to the drive motor to rotate the output shaft in the reverse rotary direction, wherein:

the rail drill control circuit is configured to receive inputs from at least two of:
a spindle feed position sensor;
a motor current sensor; and
a clock circuit and memory; and the rail drill control circuit is configured to make the drilling completion determination based on at least one of the inputs.

12. The railroad track rail drill of claim 11, wherein the rail drill control circuit is coupled to the spindle feed position sensor, and the rail drill control circuit is configured to make the drilling completion determination upon the spindle feed position sensor providing a signal to the rail drill control circuit indicating the drill spindle is in the spindle advanced position.

13. The railroad track rail drill of claim 11, wherein the rail drill control circuit is coupled to the motor current sensor, and the rail drill control circuit is configured to make the drilling completion determination upon receiving a signal from the motor current sensor indicating that current consumption of the drive motor has moved from a load current consumption to a no-load current consumption.

14. The railroad track rail drill of claim 11, wherein the rail drill control circuit includes the clock circuit and the memory, and the rail drill control circuit is configured to make the drilling completion determination upon the lapse of a predetermined period of time stored in the memory after the manual activation of the cycle initiation switch.

15. The railroad track rail drill of claim 11, wherein the rail drill control circuit is further configured to selectively (3) operably disengage the power source from the drive motor in an off configuration, and the rail drill control circuit is configured to make a cycle completion determination after making the drilling completion determination, and in response to the cycle completion determination, to operably disengage the power source from the drive motor in the off configuration.

16. The railroad track rail drill of claim 15, wherein the rail drill control circuit is configured to send a forward motor speed signal and a forward motor direction signal to a motor controller to rotate the output shaft of the drive motor in the forward rotary direction in the forward direction configuration, to send a reverse motor speed signal to the motor controller to rotate the output shaft of the drive motor in the reverse rotary direction in the reverse direction configuration, and to send a zero motor speed signal to the motor controller to turn off the drive motor in the off configuration when the drill spindle returns to the spindle retracted position.

17. The railroad track rail drill of claim 16, wherein the forward motor speed signal and the reverse motor speed signal both signal the same motor speed.

18. The railroad track rail drill of claim 15, wherein the rail drill control circuit is coupled to the spindle feed position sensor, and the rail drill control circuit is configured to make the cycle completion determination upon the spindle feed position sensor providing a signal to the rail drill control circuit indicating the drill spindle is in the spindle retracted position.

19. The railroad track rail drill of claim 18, wherein the rail drill control circuit is coupled to the motor current sensor, and the rail drill control circuit is configured to make the drilling completion determination upon receiving a signal from the motor current sensor indicating that current consumption of the drive motor has moved from a load current consumption to a no-load current consumption.

20. The railroad track rail drill of claim 19, wherein the rail drill control circuit is additionally configured to make the drilling completion determination upon the spindle feed position sensor providing the signal to the rail drill control circuit indicating the drill spindle is in the spindle advanced position.

21. A railroad track rail drill comprising:

a railroad track rail drill housing supporting a railroad track rail clamp designed to selectively couple the railroad track rail drill to a railroad track rail;

a drive motor coupled to the railroad track rail drill housing and having an output shaft;

an electrical power source operably coupled to the drive motor to cause the drive motor to selectively rotate the output shaft of the drive motor in a forward rotary direction and in a reverse rotary direction opposite the forward rotary direction; and a drive train including:

a feed train end having a spindle feed carrier operably coupled to the output shaft of the drive motor to carry a drill spindle axially toward a spindle advanced position in response to the drive motor selectively rotating in the forward rotary direction, and to carry the drill spindle axially toward a spindle retracted position opposite the spindle advanced position in response to the drive motor selectively rotating in the reverse rotary direction; and a speed train end operably coupled to the output shaft of the drive motor and to the drill spindle to rotate the drill spindle in a drilling rotary direction in response to the drive motor selectively rotating in the forward rotary direction; and a rail drill control circuit coupled to the electrical power source and to the drive motor, the rail drill control circuit including a cycle initiation switch and a motor direction selector, and the rail drill control circuit being configured, in response to a manual activation of the cycle initiation switch, to place the motor direction selector into (1) a forward direction configuration in which the power source is operably coupled to the drive motor to rotate the output shaft in the forward rotary direction, and to thereafter make a drilling completion determination without further manual input from a user, and in response to the drilling completion determination, to place the motor direction selector into (2) a reverse direction configuration in which the power source is operably coupled to the drive motor to rotate the output shaft in the reverse rotary direction, wherein the rail drill control circuit is coupled to a spindle feed position sensor, and the rail drill control circuit is configured to make the drilling completion determination upon the spindle feed position sensor providing a signal to the rail drill control circuit indicating the drill spindle is in the spindle advanced position, and wherein the spindle feed position sensor comprises at least one position sensor that is aligned with at least one groove in the spindle feed carrier.

22. The railroad track rail drill of claim 21, wherein the at least one position sensor includes a pair of position sensors, in the spindle feed carrier includes a pair of grooves in the spindle feed carrier, and each position sensor is aligned with one of the grooves.

23. The railroad track rail drill of claim 22, wherein the rail drill control circuit is configured to interpret the pair of position sensors both sending one of "open" and "closed" signals as indicating the drill spindle is in the spindle retracted position.

* * * * *